US00RE43771E

(19) United States
(12) Reissued Patent
Koncelik, Jr.

(10) Patent Number: US RE43,771 E
(45) Date of Reissued Patent: Oct. 30, 2012

(54) DISPLAY DEVICE FOR BEVERAGE PITCHER OR COFFEE MACHINE

(76) Inventor: Lawrence J. Koncelik, Jr., East Hampton, NY (US)

(21) Appl. No.: 12/707,859

(22) Filed: Feb. 18, 2010

Related U.S. Patent Documents

Reissue of:
(64) Patent No.: 7,096,776
Issued: Aug. 29, 2006
Appl. No.: 10/757,200
Filed: Jan. 14, 2004

(51) Int. Cl.
*A47J 31/00* (2006.01)
*G01K 1/08* (2006.01)
*G01K 1/14* (2006.01)

(52) U.S. Cl. ..... 99/285; 99/323.3; 116/201; 116/202; 116/279; 116/307; 116/DIG. 1

(58) Field of Classification Search ..... 99/285, 99/323.3; 116/201, 202, 205, 279, 306, 307, 116/308, DIG. 3, DIG. 1; 368/10, 108; 220/592.16, 220/592.2, 592.28; 40/442, 444, 445; D7/322, D7/397, 398, 393
See application file for complete search history.

(56) References Cited

U.S. PATENT DOCUMENTS

| | | | |
|---|---|---|---|
| 490,164 | A | 1/1893 | Ready |
| 3,327,615 | A | 6/1967 | Swan |
| 3,428,218 | A | 2/1969 | Coja |
| 3,430,232 | A | 2/1969 | Martin |
| 3,685,692 | A | 8/1972 | Erne et al. |
| 4,794,877 | A | 1/1989 | Pollard-Smith |
| 5,094,153 | A | 3/1992 | Helbling |
| 5,183,998 | A | 2/1993 | Hoffman |
| 5,509,349 | A | 4/1996 | Anderson |
| D404,250 | S | 1/1999 | Midden |
| 5,901,635 | A | 5/1999 | Lucas |
| 6,431,054 | B1 | 8/2002 | Reid |
| 6,564,696 | B2 | 5/2003 | Koncelik, Jr. |
| 2002/0020300 | A1 | 2/2002 | Koncelik, Jr. |

OTHER PUBLICATIONS

Mr. Coffee ES series User Manual Provided with 12-cup coffee maker, 2003.
Mr. Coffee AP series User Manual Provided with coffee maker, 2002.
Mr. Coffee PRX30/33 series Operating Instructions provided with coffee maker, 1996.
Mr. Coffee Speedbrew coffee maker model DSP10 Operating Instructions provided with coffee maker, May 1998.
Black and Decker 12-cup Programmable coffee maker model No. DCM3200B Use and Care book provided with coffee maker. 2007.
Mr. Coffee Classical Edition MR series User Manual Provided with coffee maker, 2006.
Cuisinart Brew Central 14-cup programmable coffeemaker DCC-2600 Series Instruction book provided with coffee maker, 2008.

*Primary Examiner* — Reginald L Alexander
(74) *Attorney, Agent, or Firm* — Brown & Michaels, PC

(57) ABSTRACT

An apparatus is disclosed comprising a display device or indicator device and a timer circuit. The display device can be placed in a first or a second state. In the first state the display device provides a first visual indication of a first type of beverage which is within a beverage receptacle. In the second state the display device provides a second visual indication of a second type of beverage which is within the beverage pitcher. The timer circuit, automatically, after a certain period of time, may change the indicator device from the first or second state to a third state in which the indicator device does not provide a visual indication of the type of beverage within a beverage container.

27 Claims, 5 Drawing Sheets

DISPLAY DEVICE FOR BEVERAGE PITCHER OR COFFEE MACHINE

Matter enclosed in heavy brackets [ ] appears in the original patent but forms no part of this reissue specification; matter printed in italics indicates the additions made by reissue.

FIELD OF THE INVENTION

This invention relates to improved methods and apparatus concerning providing signs or symbols to indicate the contents of beverage pitchers.

BACKGROUND OF THE INVENTION

U.S. Pat. No. 6,564,696 to Koncelik discloses an indicator device which provides an indication of whether coffee which has been prepared is decaffeinated or non-decaffeinated. After an operator has set the indicator device to, for example, "decafe", the indicator device remains in a state which indicates "decafe" until the indicator device is changed by an individual.

SUMMARY OF THE INVENTION

The present invention in one or more embodiments provides an apparatus comprising a timer circuit, and an indicator or display device which communicates with the timer circuit. The indicator device can be placed in a first or second state by an operator. In the first state the indicator device provides a first visual indication of a first type of beverage within a beverage receptacle. In the second state the indicator device provides a second visual indication of a second type of beverage within the beverage receptacle, wherein the second type of beverage differs from the first type of beverage.

The timer circuit can be programmed to automatically change the indicator device after a certain period of time, from the first or second state to a third state, wherein in the third state, the indicator device no longer provides a visual indication of what type of beverage is within the beverage receptacle. The beverage receptacle may be a coffee pot or a coffee machine. The first type of beverage may be non-decaffeinated coffee, and the second type of beverage may be decaffeinated coffee. The timer circuit and the indicator device can be attached or detached from a coffee machine.

The first visual indication may be a designation of the first type of beverage and may be comprised of least one alphanumeric character. The second visual indication may be a designation of the second type of beverage and may be comprised of at least one alphanumeric character.

The indicator device may be comprised of a first light under a first designation which indicates decaffeinated coffee, and a second light under a second designation which indicates non decaffeinated coffee. The first light may be part of a first push button which can be pushed in to light the first light to indicate that decaffeinated coffee has been made. The second light may be part of a second push button which can be pushed in to light the second light to indicate that non decaffeinated coffee has been made. The indicator device may be comprised of a first light which is able to emit either a first or a second color light. The first light may emit the first color light when the coffee machine has made decaffeinated coffee and the first light may emit the second color light when the coffee machine has made non decaffeinated coffee.

The indicator device may include an electronic digital display which displays whether coffee which has been made by a coffee machine is non decaffeinated or decaffeinated. The indicator device may further include a first push button which when pushed in causes the electronic digital display to toggle from displaying an indication that the coffee is decaffeinated to displaying an indication that the coffee is non decaffeinated.

A method is also provided comprising fixing an indicator device and a timer circuit on a coffee machine, wherein the indicator device can be placed into a first state or a second state by an operator. When the indicator device is placed in a first state, the indicator device provides a first visual indication of a first type of beverage which is within a coffee receptacle. When the indicator device is placed in a second state the indicator device provides a second visual indication of a second type of beverage which is within the coffee receptable. The timer circuit, after a certain period of time, may cause the indicator device to automatically change from the first or second state to a third state in which the indicator device does not indicate what type of beverage is within the coffee receptacle.

DETAILED DESCRIPTION OF THE DRAWINGS

Figure 1:
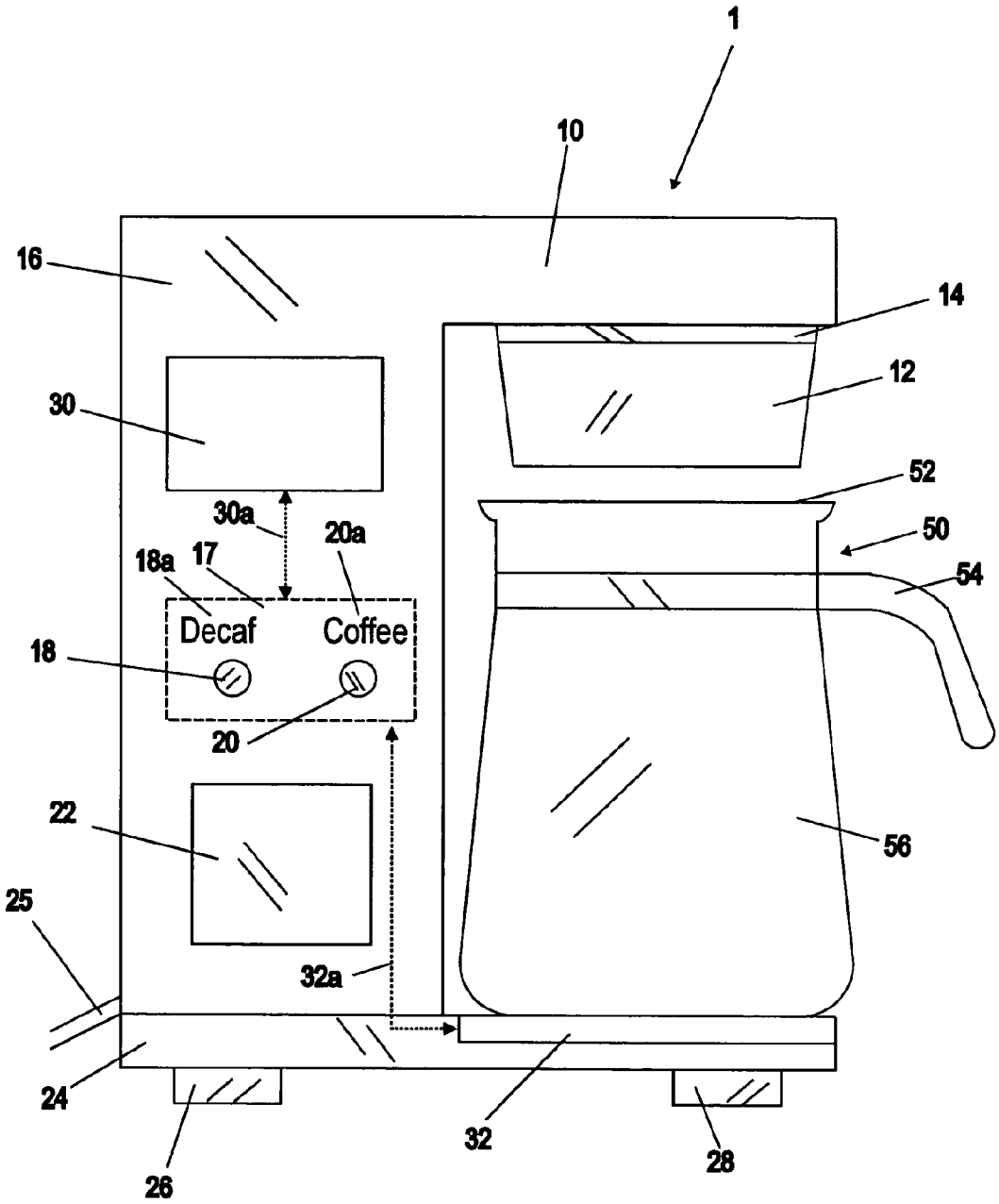
FIG. 1 shows a coffee machine in accordance with an embodiment of the present invention including an indicator or display device showing a light under a designation to indicate whether coffee which has been prepared in a coffee pot is regular or decaffeinated.

FIG. 1 shows a coffee machine 1 in accordance with an embodiment of the present invention including an indicator device 17. The coffee machine 1 includes an extension 10, portions 12, 14, 16, indicator device 18, control panel 22, power cord 25 (shown partially) which may be electrically connected to a power outlet, base 24, and legs 26 and 28. The coffee machine 1 may be similar to or identical to known available coffee machines, such as "Mr. Coffee" (Trademarked) except for some additional components which will be described. FIG. 1 also shows a coffee pot 50 having an opening 52 for receiving coffee from the coffee machine 1, a handle 54 and a receptacle 56 in which the coffee is stored.

The indicator device 17 includes push button lights 18 and 20 which are under designation "Decaf" 18a and "Coffee" 20a respectively. The push button lights 18 and 20 are both toggle switches and as such if they are turned off, they will light up when pushed, and if they are turned on, they will turn off when pushed in.

If an individual has made decaffeinated coffee in the coffee pot 50 they may cause the push button light 18 to light and cause the push button light 20 to stay off. Thus light 18 is lit under designation 18a for "Decaf". If an individual has made regular coffee in the coffee pot 50 they may cause the push button light 20 to turn off and cause the push button light 18 to stay on. Thus light 20 is lit under designation 18a for "Coffee". In this way, any person who wants to have a cup of coffee from the coffee pot 50 will know whether it is coffee (i.e. regular non-decaffeinated coffee) or decaffeinated coffee.

The push button lights 18 and 20 will also turn off when turned off by a timer circuit 30. The timer circuit 30 is electrically connected to the indicator device 17 by bus 30a. The timer circuit 30 may also be electrically connected to a hot plate device 32. The hot plate device 32 may provide a signal to the timer circuit 30 when the hot plate device 32 is not longer heating the coffe pot 50. In response to such a signal the timer circuit 30 may send a signal via bus 30a to turn off both lights 18 and 20, if they are on. When the decaffeinated push button light 18 is pushed the light 18 goes on. In addition, a signal may be sent to the timer circuit 30 starting a timer, such as a one hour timer. After an hour, the timer circuit 30 may send a signal via bus 30a to the indicator device 17 which will turn off the light 18.

Figure 2:
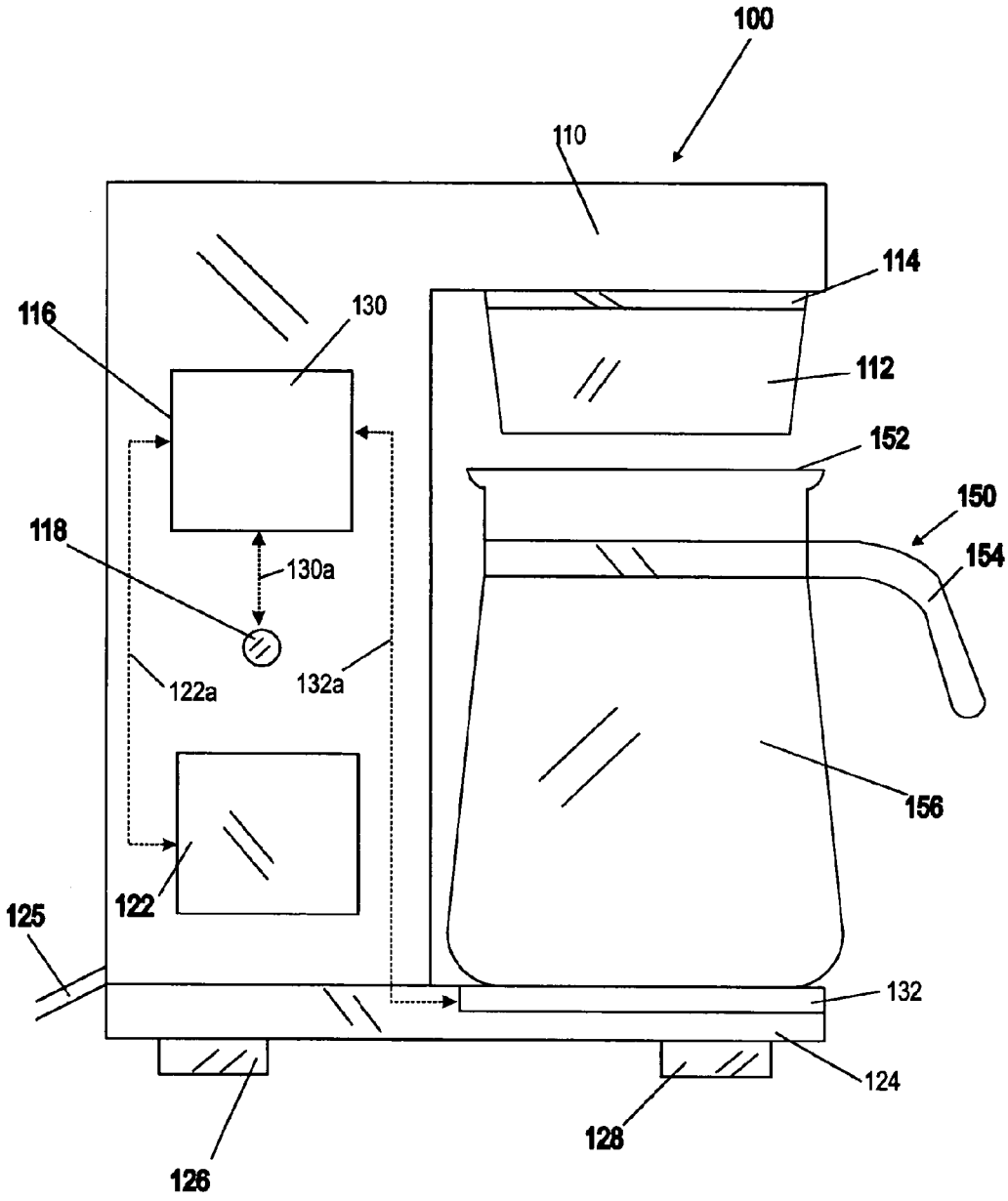
FIG. 2 shows a coffee machine in accordance with another embodiment of the present invention including an indicator or display device showing only a light, which may be one of two colors, to indicate whether coffee which has been prepared in a coffee pot is regular or decaffeinated.

FIG. 2 shows a coffee machine 100 in accordance with another embodiment of the present invention including an indicator device 118 which is only a light in this example and which may emit one of two colors, to indicate whether coffee which has been prepared in a coffee pot 150 is regular or decaffeinated. The coffee machine 100 may be similar to coffee machine 1 except to the difference between indicator device 17 and indicator device 118, and other differences which will be described. Coffee machine 100 includes an extension 110, portions 112, 114, 116, indicator device 118, control panel 122, power cord 125 (shown partially) which may be electrically connected to a power outlet, base 124, and legs 126 and 128. FIG. 2 also shows a coffee pot 150 having an opening 152 for receiving coffee from the coffee machine 100, a handle 154 and a receptacle 156 in which the coffee is stored.

The indicator device 118 is a push button single light which can be toggled to emit either a green color light, a red color light, or to emit no light at all, i.e. be turned off. An individual can use, for example, green to indicate that Decaffeinated coffee has been made in coffee pot 150 and red to indicate that regular coffee has been made in coffee pot 150.

The coffee machine also includes a timer circuit 130 and a hot plate 132. The timer circuit 130 is electrically connected to the indicator device 118 via bus 130a. The timer circuit 130 is also electrically connected to the hot plate 132 via bus 132a.

In operation, after an individual pushes the push button 118 to, for example, light a green color, the timer circuit 130 may be sent a signal from the button 118 to cause, for example, a one hour timer to start. After the one hour timer expires, the timer circuit 130 may send a signal to the button 118, via bus 130a, which will cause the button to go dark, i.e. be turned off.

The timer circuit 130 may also receive a signal from the hot plate 132, indicating that the hot plate 132 has turned off. The timer circuit 130 in response to the hot plate 132 turning off, may send a signal to the button 118, to turn the light of the button 118 off.

Figure 3:
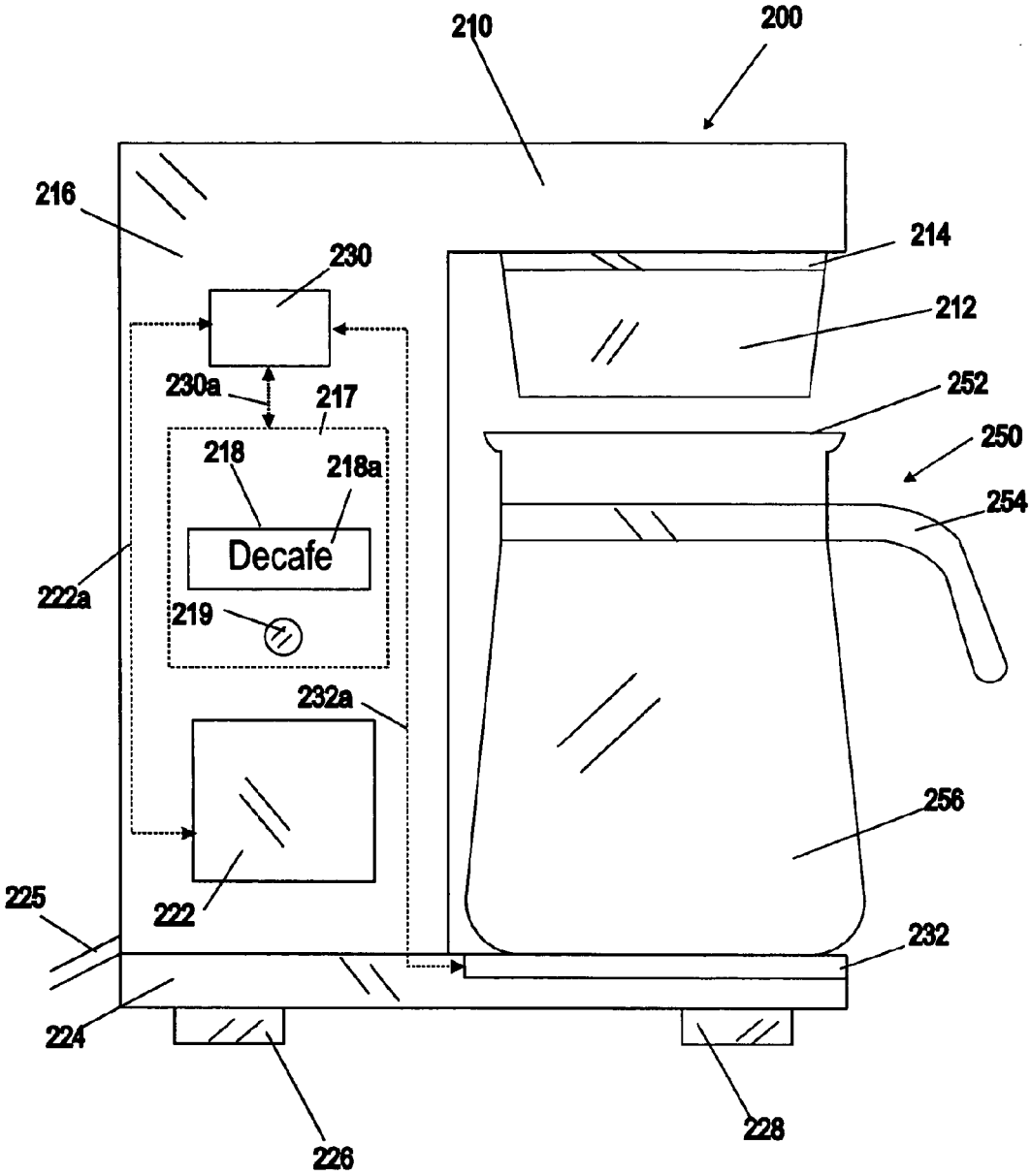
FIG. 3 shows a coffee machine in accordance with another embodiment of the present invention having an indicator or display device which includes a push button and a electronic digital display to indicate whether coffee which has been prepared in a coffee pot is regular or decaffeinated and a coffee pot.

FIG. 3 shows a coffee machine 200 in accordance with another embodiment of the present invention having an indicator device 217 which includes a push button 219 and a electronic digital display 218 to indicate whether coffee which has been prepared in a coffee pot 250 is regular or decaffeinated. The coffee machine 200 may be identical to coffee machine 100 except for the difference between indicator device 118 and the indicator device 217. Coffee machine 200 includes an extension 210, portions 212, 214, 216, indicator device 217, control panel 222, power cord 225 (shown partially) which may be electrically connected to a power outlet, base 224, and legs 226 and 228. FIG. 3 also shows a coffee pot 250 having an opening 252 for receiving coffee from the coffee machine 200, a handle 254 and a receptacle 256 in which the coffee is stored.

An individual can set the electronic digital display 218 to a "Decaf" 218a designation as in FIG. 3 by pressing the push button 219 a certain number of times. When the push button 219 is next pressed the designation on the digital display 218 may turn to a "Coffee" designation. The push button 219 may be a toggle switch which toggles the "Decaf" and "Coffee" designations on the display 218.

The coffee machine 200 may also include a timing circuit 230 which may be electrically connected to the indicator device 217 by a bus 230a. The coffee machine 200 may also include a hot plate 232 which may be electrically connected to the timing circuit 230 by bus 232a.

In operation, after an individual pushes the push button 219 to, for example, cause the word "Decafe" to appear on the display 218, the timer circuit 230 may be sent a signal from the button 219 and/or indicator device 217 to cause, for example, a one hour timer to start. After the one hour timer expires, the timer circuit 230 may send a signal to the digital display 218, via bus 230a, which may cause the digital display 218 to go dark, to show a blank screen, or to indicate in some other way that the time has expired and that type of coffee can either no longer be determined or the indication of the type of coffee must be verified or updated.

The timer circuit 230 may also receive a signal from the hot plate 232, indicating that the hot plate 232 has been turned off. The hot plate 232 may be used to heat coffee pot 250. The timer circuit 130 in response to the hot plate 232 turning off, may send a signal to the digital display 218 via bus 232a to turn the digital display 218 to go dark, to show a blank screen, or to indicate in some other way that the time has expired and that the type of coffee can either no longer be determined or the indication of the type of coffee must be verified or updated.

Figure 4:
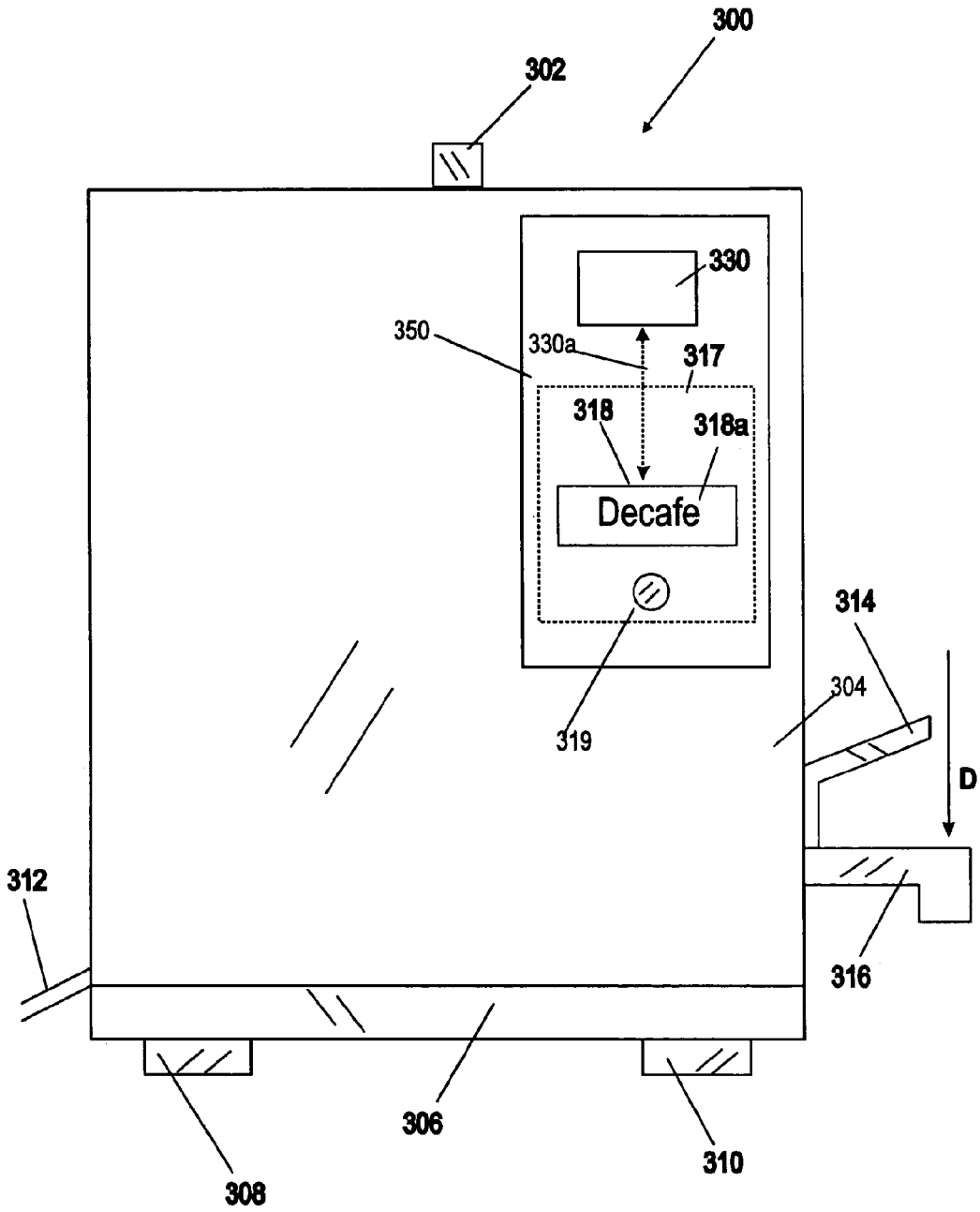
FIG. 4 shows a commercial electric coffee machine including a spigot in accordance with another embodiment of the present invention having an indicator or display device to indicate whether coffee which has been prepared is regular or decaffeinated.
Figure 5:
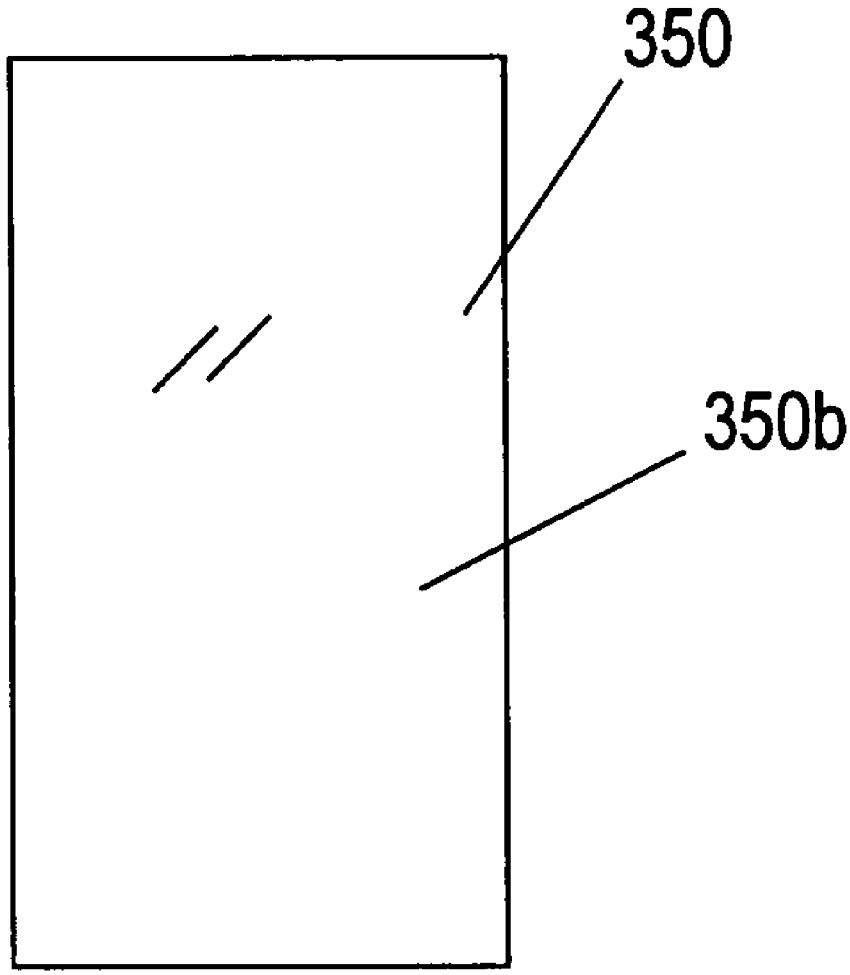
FIG. 5 shows a backing of the display device of FIG. 4.

FIG. 4 shows a commercial electric coffee machine 300 in accordance with another embodiment of the present invention. The machine 300 includes receptacle 304, spigot switch 314, spigot 316, power cord 312 for connecting to an electrical outlet, base 306, legs 308 and 310, and display device or indicator device 350. The display device or indicator device 350 may be detachable from the rest of coffee machine 300. The display device or indicator device 350 may include a digital display 318 and a button 319. The display device 350 may further include a timer circuit 330 electrically connected to the digital display 318 by a bus 330a. The display device 350 may function similar to the device 217 and timer circuit 230 shown in FIG. 3. Instead of the display device 350, the timer circuit 30 and device 17 can be used or the timer circuit 130 and the button 118 can be used.

The spigot switch 314, when pressed downwards in a direction D, allows coffee to flow from the receptacle 304 through the spigot 316 and out of the coffee machine 300. The machine 300 may be similar to those known in the art with the exception of indicator device 350. The indicator device 350 may be provided or sold separately. The indicator device 350 may include an adhesive backing for attaching or detaching the indicator device 350 to or from the machine 300. The indicator device 350 may include a "Decafe" designation 318a which is shown and a "coffee" designation which is not shown. The indicator device 350 can be fixed to the receptacle 304 and part of the machine 300.

FIG. 10 shows a backside 350b of the display device 350 of FIG. 4. The backside is made of an adhesive material which can stick to, for example, machine 300 in FIG. 4, to temporarily attach the device 350 to machine 300.

The timer circuit 30 and/or device 17 of FIG. 1, timer circuit 130 and/or button 118 of FIG. 2, or the timer circuit 230 and/or device 317 of FIG. 3, could take the place of, a warmer light on an automatic coffee pot. Thus, when the person making the coffee pushes a button that says "coffee" two things would happen—the warmer plate, such as warmer or hot plate 32 of FIG. 1 would go on, and a light, such as light 20 would go on lighting up the words, "Coffee" or providing a light under the word "Coffee". The timer circuits 30, 130, and 230 can be programmed through control panel 22, 122, and 222, via busses 22a, 122a, and 222a, respectively, to cause the devices 17, 118, and 317, respectively, to go out after a set time—a time that can be programed in by the user. The control panels 22, 122, and 222 may include a keypad for data entry. The timer circuits 30, 130, and 230 can also be programmed to cause the devices 17, 118, and 317, respectively to go off when the warmer or hot plates 32, 132, and 232, respectively, go off.

By having the selection display go out after a certain amount of time, the coffee user will always be assured that each time a new pot is made, the maker would have had to affirmatively select either decafe or Coffee or perhaps decafe/coffee mix if that is what is contained in the pot.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

[1. An apparatus comprising
a timer circuit; and
an indicator device which communicates with the timer circuit;
wherein the indicator device can be placed in a first or second state by an operator;
wherein in the first state the indicator device provides a first visual indication of a first type of beverage within a beverage receptacle;
wherein in the second state the indicator device provides a second visual indication of a second type of beverage within the beverage receptacle, wherein the second type of beverage differs from the first type of beverage;
and wherein the timer circuit can be programmed to automatically change the indicator device after a certain period of time from the first or second state to a third state, wherein in the third state, the indicator device no longer provides a visual indication of what type of beverage is within the beverage receptacle.]

[2. The apparatus of claim 1 wherein
the first type of beverage is non-decaffeinated coffee; and
the second type of beverage is decaffeinated coffee.]

[3. The apparatus of claim 2 wherein
the timer circuit and the indicator device can be attached or detached from a coffee machine.]

[4. The apparatus of claim 1 wherein
the first visual indication is a designation of the first type of beverage and is comprised of least one alphanumeric character; and
the second visual indication is a designation of the second type of beverage and is comprised of at least one alphanumeric character.]

[5. The apparatus of claim 1 wherein
the beverage receptacle is a coffee pot.]

[6. The apparatus of claim 5 wherein
the first type of beverage is decaffeinated coffee; and
the second type of beverage is non decaffeinated coffee.]

[7. The apparatus of claim 2 wherein
the indicator device comprises
a first light under a first designation which indicates decaffeinated coffee; and
a second light under a second designation which indicates non decaffeinated coffee.]

[8. The apparatus of claim 7 wherein
the first light is part of a first push button which can be pushed in to light the first light to indicate that decaffeinated coffee has been made; and
the second light is part of a second push button which can be pushed in to light the second light to indicate that non decaffeinated coffee has been made.]

[9. The apparatus of claim 2 wherein
the indicator device comprises
a first light which is able to emit either a first or a second color light;
and wherein the first light emits the first color light when the coffee machine has made decaffeinated coffee and the first light emits the second color light when the coffee machine has made non decaffeinated coffee.]

[10. The apparatus of claim 9 wherein
the first light is part of a first push button which can be pushed in to light the first light and to toggle the first light from emitting a first color light to emitting a second color light.]

[11. The apparatus of claim 2 wherein
the indicator device includes an electronic digital display which displays whether coffee which has been made by the coffee machine is non decaffeinated or decaffeinated.]

[12. The apparatus of claim 11 wherein
the indicator device includes a first push button which when pushed in causes the electronic digital display to toggle from displaying an indication that the coffee is decaffeinated to displaying an indication that the coffee is non decaffeinated.]

[13. The apparatus of claim 2 further comprising
the coffee machine which includes a spigot through which coffee can flow;
and wherein the coffee machine includes a spigot switch for allowing coffee to flow from the coffee machine through the spigot.]

[14. A method comprising the steps of
fixing an indicator device and a timer circuit on a coffee machine;
wherein the indicator device can be placed into a first state or a second state by an operator;
wherein when the indicator device is placed in a first state the indicator device provides a first visual indication of a first type of beverage which is within a coffee receptacle;

wherein when the display device is placed in a second state the indicator device provides a second visual indication of a second type of beverage which is within the coffee receptable; and wherein the first and second type of beverages differ and the first and second visual indications differ;

and wherein the timer circuit, after a certain period of time, causes the indicator device to automatically change from the first or second state to a third state in which the indicator device does not indicate what type of beverage is within the coffee receptacle.]

[15. The method of claim 14 wherein the first type of beverage is decaffeinated coffee; and the second type of beverage is non decaffeinated coffee.]

[16. The method of claim 14 wherein the first visual indication is a designation of the first type of beverage and is comprised of least one alphanumeric character; and the second visual indication is a designation of the second type of beverage and is comprised of at least one alphanumeric character.]

*17. An apparatus for indicating a type of beverage in a beverage receptacle removable from the apparatus, the apparatus comprising:*

*a timer circuit; and*

*an indicator device which communicates with the timer circuit;*

*wherein the indicator device can be placed in a first or second state by an operator;*

*wherein in the first state the indicator device provides a first visual indication of a first type of beverage within the beverage receptacle;*

*wherein in the second state the indicator device provides a second visual indication of a second type of beverage within the beverage receptacle;*

*wherein the second type of beverage differs from the first type of beverage;*

*and wherein the timer circuit changes the indicator device from the first state or second state to a third state in which the apparatus no longer provides a visual indication of what type of beverage is within the beverage receptacle, after a predetermined period of time after the beverage has been prepared for use by a machine, such that, during the predetermined period of time, a subsequent user of the apparatus is informed of the beverage type.*

*18. The apparatus of claim 17 wherein*

*the first type of beverage is non-decaffeinated coffee; and*

*the second type of beverage is decaffeinated coffee.*

*19. The apparatus of claim 18 wherein*

*the timer circuit and the indicator device can be attached or detached from the machine.*

*20. The apparatus of claim 18 wherein*

*the indicator device comprises*

*a first light which is able to emit either a first or a second color light;*

*and wherein the first light emits the first color light when the machine has made decaffeinated coffee and the first light emits the second color light when the machine has made non decaffeinated coffee.*

*21. The apparatus of claim 20 wherein*

*the first light is part of a first push button which can be pushed in to light the first light and to toggle the first light from emitting a first color light to emitting a second color light.*

*22. The apparatus of claim 17 wherein*

*the first visual indication is a designation of the first type of beverage and is comprised of least one alphanumeric character; and*

*the second visual indication is a designation of the second type of beverage and is comprised of at least one alphanumeric character.*

*23. The apparatus of claim 17 wherein*

*the beverage receptacle is a coffee pot.*

*24. The apparatus of claim 23 wherein*

*the first type of beverage is decaffeinated coffee; and*

*the second type of beverage is non decaffeinated coffee.*

*25. The apparatus of claim 18 wherein*

*the indicator device comprises*

*a first light under a first designation which indicates decaffeinated coffee; and*

*a second light under a second designation which indicates non decaffeinated coffee.*

*26. The apparatus of claim 25 wherein*

*the first light is part of a first push button which can be pushed in to light the first light to indicate that decaffeinated coffee has been made; and*

*the second light is part of a second push button which can be pushed in to light the second light to indicate that non decaffeinated coffee has been made.*

*27. The apparatus of claim 18 wherein*

*the indicator device includes an electronic digital display which displays whether coffee which has been made by the machine is non decaffeinated or decaffeinated.*

*28. The apparatus of claim 27 wherein*

*the indicator device includes a first push button which when pushed in causes the electronic digital display to toggle from displaying an indication that the coffee is decaffeinated to displaying an indication that the coffee is non decaffeinated.*

*29. The apparatus of claim 18, wherein the predetermined time is about an hour.*

*30. A method for indicating a type of beverage in a coffee receptacle, the method comprising the steps of:*

*fixing an indicator device and a timer circuit on a coffee machine;*

*wherein the indicator device can be placed into a first state or a second state by an operator;*

*wherein the coffee receptacle is removable from the coffee machine;*

*wherein when the indicator device is placed in a first state the indicator device provides a first visual indication of a first type of beverage which is within the coffee receptacle;*

*wherein when the display device is placed in a second state the indicator device provides a second visual indication of a second type of beverage which is within the coffee receptacle; and*

*wherein the first and second type of beverages differ and the first and second visual indications differ;*

*and wherein the timer circuit, after a predetermined period of time, causes the indicator device to automatically change from the first or second state to a third state in which there is no indication as to what type of beverage is within the coffee receptacle;*

*wherein, during the predetermined period of time, a subsequent user of the apparatus is informed of the beverage type after the beverage has been prepared for use by the coffee machine.*

*31. The method of claim 30 wherein*

*the first type of beverage is decaffeinated coffee; and*

*the second type of beverage is non decaffeinated coffee.*

*32. The method of claim 30 wherein*

*the first visual indication is a designation of the first type of beverage and is comprised of least one alphanumeric character; and*

*the second visual indication is a designation of the second type of beverage and is comprised of at least one alphanumeric character.*

*33. The method of claim 30, wherein*

*the coffee machine comprises a hot plate electrically connected to the timer circuit;*

*such that when the hot plate is turned off, the timer circuit changes the indicator device to the third state.*

*34. A method for indicating a type of beverage in a coffee receptacle, the method comprising the steps of:*

*fixing an indicator device and a timer circuit on a coffee machine; and*

*sending a signal from the indicator device to the timer circuit to start a timer;*

*wherein the indicator device can be placed into a first state or a second state by an operator;*

*wherein the coffee receptacle is removable from the coffee machine;*

*wherein when the indicator device is placed in a first state the indicator device provides a first visual indication of a first type of beverage which is within the coffee receptacle;*

*wherein when the display device is placed in a second state the indicator device provides a second visual indication of a second type of beverage which is within the coffee receptacle; and*

*wherein the first and second type of beverages differ and the first and second visual indications differ;*

*and wherein the timer circuit, after a predetermined period of time on the timer has elapsed, sends a signal to the indicator device to cause the indicator device to automatically change from the first or second state to a third state in which the indicator device does not indicate what type of beverage is within the coffee receptacle, the predetermined period of time being chosen such that a subsequent user of the apparatus is informed of the beverage type after the beverage has been prepared for use by the coffee machine.*

*35. An apparatus for indicating a type of beverage in a beverage receptacle removable from the apparatus, the apparatus comprising:*

*a timer circuit; and*

*an indicator device which communicates with the timer circuit;*

*wherein the indicator device can be placed in a first or second state by an operator;*

*wherein the first or second state is selected before a machine makes the beverage ready for use;*

*wherein in the first state the indicator device provides a first visual indication of a first type of beverage within the beverage receptacle;*

*wherein in the second state the indicator device provides a second visual indication of a second type of beverage within the beverage receptacle, wherein the second type of beverage differs from the first type of beverage;*

*wherein the timer circuit is programmed so that the indicator device remains in the first or second state for a predetermined period of time that is after the machine has made the beverage ready for use;*

*wherein after the predetermined time the indicator device automatically changes from the first or second state to a third state; and*

*wherein in the third state, the apparatus no longer provides a visual indication of what type of beverage is within the beverage receptacle.*

*36. The apparatus of claim 35 wherein the first state or the second state is selected when the operator makes the beverage with use of the machine.*

*37. A method for indicating a type of beverage in a coffee receptacle, the method comprising the steps of:*

*fixing an indicator device and a timer circuit on a coffee machine;*

*wherein the coffee receptacle is removable from the coffee machine;*

*wherein the indicator device can be placed into a first state or a second state by an operator;*

*wherein the first and second type of beverages differ and the first and second visual indications differ;*

*wherein the first or second state is selected before the coffee machine makes the beverage ready for use;*

*wherein when the indicator device is placed in a first state the indicator device provides a first visual indication of a first type of beverage which is within the coffee receptacle;*

*wherein when the indicator device is placed in a second state the indicator device provides a second visual indication of a second type of beverage which is within the coffee receptacle; and*

*wherein the timer circuit is programmed so that the indicator device remains in the first or second state for a predetermined period of time that is after the coffee machine has made the beverage ready for use;*

*wherein after the predetermined time the indicator device automatically changes from the first or second state to a third state;*

*wherein, in the third state, there is no indication as to what type of beverage is within the coffee receptacle.*

*38. The method of claim 37 wherein the first state or the second state is selected when the operator makes the coffee using the coffee machine.*

*39. An apparatus for indicating a type of beverage in a beverage receptacle removable from the apparatus, the apparatus comprising:*

*a timer circuit; and*

*an indicator device which communicates with the timer circuit;*

*wherein the indicator device can be placed in a first or second state by an operator;*

*wherein the first or second state is selected before a machine makes the beverage ready for use;*

*wherein in the first state the indicator device provides a first visual indication of a first type of beverage within the beverage receptacle;*

*wherein in the second state the indicator device provides a second visual indication of a second type of beverage within the beverage receptacle, wherein the second type of beverage differs from the first type of beverage;*

*wherein the timer circuit is programmed so that the indicator device remains in the first or second state for a predetermined period of time that is after the machine has made the beverage that is in the receptacle ready for use;*

*wherein after the predetermined time the indicator device automatically changes from the first or second state to a third state;*

*wherein in the third state, the apparatus no longer provides a visual indication of what type of beverage is within the beverage receptacle.*

*40. The apparatus of claim 39 wherein the first state or the second state is selected when the operator makes the beverage using the machine.*

*41. A method for indicating a type of beverage in a coffee receptacle, the method comprising the steps of:*

*fixing an indicator device and a timer circuit on a coffee machine; and*

*sending a signal from the indicator device to the timer circuit to start a timer;*

*wherein the indicator device can be placed into a first state or a second state by an operator;*

*wherein the first or second state is selected before the coffee machine makes the beverage ready for use;*

*wherein the coffee receptacle is removable from the coffee machine;*

*wherein when the indicator device is placed in a first state the indicator device provides a first visual indication of a first type of beverage which is within the coffee receptacle;*

*wherein when the indicator device is placed in a second state the indicator device provides a second visual indication of a second type of beverage which is within the coffee receptacle; and*

*wherein the first and second type of beverages differ and the first and second visual indications differ;*

*wherein the timer circuit is programmed so that the indicator device remains in the first or second state for a predetermined period of time that is after the coffee machine has made the beverage ready for use;*

*wherein the timer sends a signal to the indicator device to cause the indicator device to automatically change from the first state or the second state to a third state;*

*wherein, in the third state there is no visual indication of what type of beverage is within the coffee receptacle.*

*42. An apparatus for indicating a type of beverage in a beverage receptacle removable from the apparatus, the apparatus comprising:*

*a timer circuit; and*

*an indicator device which communicates with the timer circuit;*

*wherein the indicator device can be placed in a first or second state by an operator;*

*wherein the first or second state is selected before the machine makes the beverage ready for use;*

*wherein in the first state the indicator device provides a first visual indication of a first type of beverage within the beverage receptacle after the machine has made the beverage;*

*wherein in the second state the indicator device provides a second visual indication of a second type of beverage within the beverage receptacle after the machine has made the beverage;*

*wherein the second type of beverage differs from the first type of beverage;*

*wherein the timer circuit is programmed so that the indicator device remains in the first or second state for a predetermined period of time that is after the machine has made the beverage ready for use;*

*wherein after the predetermined time the indicator device automatically changes from the first or second state to a third state; and*

*wherein in the third state, the apparatus no longer provides a visual indication of what type of beverage is within the beverage receptacle.*

*43. A method for indicating a type of beverage in a coffee receptacle, the method comprising the steps of:*

*fixing an indicator device and a timer circuit on a coffee machine;*

*wherein the coffee receptacle is removable from the coffee machine;*

*wherein the indicator device can be placed into a first state or a second state by an operator;*

*wherein the indicator device is placed in the first or second state before the beverage is made by the machine;*

*wherein, in the first state the indicator device provides a first visual indication of the first type of beverage which is within the coffee receptacle;*

*wherein, in the second state the indicator device provides a second visual indication of a second type of beverage which is within the coffee receptacle;*

*wherein the first and second type of beverages differ and the first and second visual indications differ;*

*and wherein the timer circuit changes the indicator device from the first or second state to a third state in which there is no indication as to what type of beverage is within the coffee receptacle, after a predetermined period of time after the beverage has been prepared for use by the coffee machine, such that, during the predetermined period of time, a subsequent user of the apparatus is informed of the beverage type.*

* * * * *